United States Patent [19]
Weikert

[11] Patent Number: 5,529,028
[45] Date of Patent: Jun. 25, 1996

[54] ACCESSORY CONTROL SYSTEM FOR A VEHICLE

[75] Inventor: Jeffrey M. Weikert, Columbus, Ind.

[73] Assignee: Cummins Engine Company, Inc., Columbus, Ind.

[21] Appl. No.: 482,834

[22] Filed: Jun. 7, 1995

[51] Int. Cl.[6] ............................................. F01P 7/02
[52] U.S. Cl. ................................. 123/41.12; 123/198 R
[58] Field of Search ........................... 123/41.11, 41.12, 123/41.49, 198 R

[56] References Cited

U.S. PATENT DOCUMENTS

| | | | |
|---|---|---|---|
| 2,706,468 | 4/1955 | Wilcox | 123/41.11 |
| 2,720,087 | 10/1955 | Groene | 123/41.11 |
| 2,822,790 | 2/1958 | Bartholome | 123/41.11 |
| 3,096,662 | 7/1963 | McRae | 123/41.11 |
| 3,596,524 | 8/1971 | Cook | 123/41.11 |
| 3,692,007 | 9/1972 | Nilssen | 123/198 R |
| 4,425,766 | 1/1984 | Claypole | 123/41.12 |
| 4,651,922 | 3/1987 | Noba | 123/41.12 |
| 4,881,494 | 11/1989 | Ishigami | 123/41.12 |
| 4,941,437 | 7/1990 | Suzuki et al. | 123/41.12 |
| 5,094,332 | 3/1992 | Wall | 192/82 T |
| 5,117,898 | 6/1992 | Light et al. | 123/41.08 |
| 5,133,302 | 7/1992 | Yamada et al. | 123/41.12 |

*Primary Examiner*—Noah P. Kamen
*Attorney, Agent, or Firm*—Woodard, Emhardt, Naughton, Moriarty & McNett

[57] ABSTRACT

An accessory control system for a vehicle which includes an engine, cooling fan driven by the engine and a selectively-operable, power-requiring accessory includes an electronic logic control module which is packaged within a logic control box and which is electrically connected between various sensors and various power-requiring accessories. The accessory control system further includes a first signal output line which is electrically connected between the logic control module and a power-requiring accessory, such as a combine unloader. Also connected to the logic control module is an engine temperature sensor which operates on a thermocouple principle and is connected to a relay within the logic control module. If the engine temperature is below a threshold level then the logic control module is able to disengage the cooling fan so as to make additional horsepower available for operation of the power-requiring accessory. The engine temperature sensor is electrically connected to the logic control module and the logic control module is further connected to the engaging clutch for the cooling fan. While the power-requiring accessory (unloader) is being used, if the engine temperature rises to the threshold level the corresponding signal will be sent to the logic control module which will reengage the cooling fan in order to protect the engine from overheating. By being able to divert horsepower from some accessory which is not required, another accessory can be used without any significant reduction in the engine horsepower which is used to drive the vehicle at a desired speed.

18 Claims, 1 Drawing Sheet

ACCESSORY CONTROL SYSTEM FOR A VEHICLE

BACKGROUND OF THE INVENTION

The present invention relates in general to the utilization and control of various accessories which are associated with a particular vehicle or engine. More specifically, the present invention relates to the distribution of engine power (horsepower) between various engine or vehicle functions and accessories in order to provide additional power to one function and less power to another function. Similarly, in accordance with the present invention one function may be to engage or activate and another function may be to disengage or deactivate in order to divert the necessary horsepower to the function being energized or activated.

Generally speaking any engine, whether a motor vehicle engine, an engine used for farm machinery or some other type of industrial engine, has certain limits as to the available power output or horsepower available at the flywheel. The more accessories or other functions which are to be driven by the engines power output, the greater the overall horsepower drain on the engine. In certain situations the total horsepower drain or load on the engine is so close to the maximum power which is available that it is not possible to provide increased boost power. As a consequence, there may be occasions when some additional task or function by means of a related accessory is desired to be performed, but the necessary horsepower is simply not available without detracting or draining power from some other engine function. A result of activating or energizing this additional task or function could be unsatisfactory engine performance, such as a diversion of engine horsepower and a corresponding reduction in engine or vehicle speed. For example, an automobile has greater acceleration when its air conditioner is turned off, because the power drain caused by the air conditioner is available for the engine to use for acceleration.

Another practical example of the aforementioned situation can be provided by considering a farm combine (with an unloader) which is moving at a preferred and desired speed. The farmer then wishes to operate the unloader. Without the concepts, functions and structure of the present invention, the energizing or activation of the unloader would cause a power drain on the engine which in turn would cause a speed reduction. As a consequence of the speed reduction, the combine is no longer traveling at the preferred or desired speed and this must be viewed as a disadvantage or shortcoming as to the overall operation of the combine.

According to the present invention this problem is solved by sensing the activation or engagement of the unloader and then turning off some other power-absorbing accessory, such as the engine cooling fan. In this way the total power demand is not materially affected, there has simply been a shifting, diverting or redistribution of the available power. As a consequence, the preferred and desired combine speed can be generally maintained.

Since the deactivation of the cooling fan might, depending upon several factors, cause the engine (coolant system) temperature to creep toward an unacceptable level, the present invention includes appropriate sensors to protect the engine. If the temperature sensor shows that the cooling system is at or above a particular threshold level, the cooling fan is either not disengaged in the beginning or is reengaged whenever the threshold temperature is reached so as to protect the engine.

A second level logic decision could be made, according to the present invention, if it is not possible to disengage the cooling fan due to the engine temperature. It is possible to sense the condition or status of some other power-absorbing accessory which could then be disengaged or deactivated in lieu of the cooling fan. While the power drain for this secondary accessory might be less than the power drain or power consumption required by the cooling fan, disengaging this secondary accessory would still provide some additional horsepower back to the engine and thus while the unloader was operating the slowing effect on the engine and ultimately vehicle speed would be lessened by the supplemental horsepower from the secondary accessory.

Over the years a few attempts have been made by others to engage and disengage engine accessories according to certain performance strategies. A representative sampling of these earlier efforts is believed to be provide by the following patent references:

| Patent No. | Patentee | Issue Date |
| --- | --- | --- |
| 2,706,468 | Wilcox | Apr. 19, 1955 |
| 2,720,087 | Groene | Oct. 11, 1955 |
| 2,822,790 | Bartholome | Feb. 11, 1958 |
| 3,096,662 | McRae | Jul. 9, 1963 |
| 3,596,524 | Cook | Aug. 3, 1971 |
| 4,425,766 | Claypole | Jan. 17, 1984 |
| 4,651,922 | Noba | Mar. 24, 1987 |
| 4,881,494 | Ishigami | Nov. 21, 1989 |
| 4,941,437 | Suzuki, et al. | Jul. 17, 1990 |
| 5,094,332 | Wall | Mar. 10, 1992 |
| 5,117,898 | Light et al. | Jun. 2, 1992 |
| 5,133,302 | Yamada et al. | Jul. 28, 1992 |

Although a variety of concepts and structures are disclosed by the foregoing listed patents none provide the specifics of the present invention. For example, Wall ('332) discloses a control system for engaging and disengaging a clutch connected between an engine and an accessory, such as an air conditioning compressor of a vehicle. The system includes a microprocessor 12 for controlling both the initial engagement and subsequent operation of the clutch 11 in response to various sensed conditions, such as the level of engine vacuum and thus engine load. Microprocessor 12 may delay engagement of the clutch 11 until the load on the engine is reduced, thus preventing stalling of the engine. However, this reference fails to specifically disclose a control system which disengages a power-absorbing accessory from the engine in response to the actuation of a second power-absorbing accessory connected to the engine.

As another example of the deficiencies of these earlier efforts, McRae ('662) discloses an engine accessory drive which functions at certain high speeds of the engine to disengage the clutch to reduce the speed of the cooling fan and power steering pump while allowing the water pump to run at higher speeds. While this reference seems to recognize that the extra power required to run the water pump at engine speed is more than offset by the lower fan speed, it fails to disclose or suggest disengaging or unloading the fan or power steering pump upon the actuation of the other accessory.

SUMMARY OF THE INVENTION

An accessory control system for a vehicle having an engine, a cooling fan driven by the engine and a selectively-operable, power-requiring accessory according to one embodiment of the present invention comprises a logic control module, a first signal output line electrically connected between the logic control module and the power-requiring accessory, an engine temperature sensor connected to the engine and operable to send a temperature signal to the logic control module based upon the engine temperature, a signal input line electrically connected between the logic control module and the engine temperature sensor and a second signal output line electrically connected between the logic control module and the cooling fan, such that when the power-requiring accessory is energized and the engine temperature is below a predetermined threshold level, the logic control module disengages the cooling fan in order to provide at least some of the required power for operation of the power-requiring accessory.

One object of the present invention is to provide an improved accessory control system for a vehicle.

Related objects and advantages of the present invention will be apparent from the following description.

DESCRIPTION OF THE PREFERRED EMBODIMENT

Figure 1:
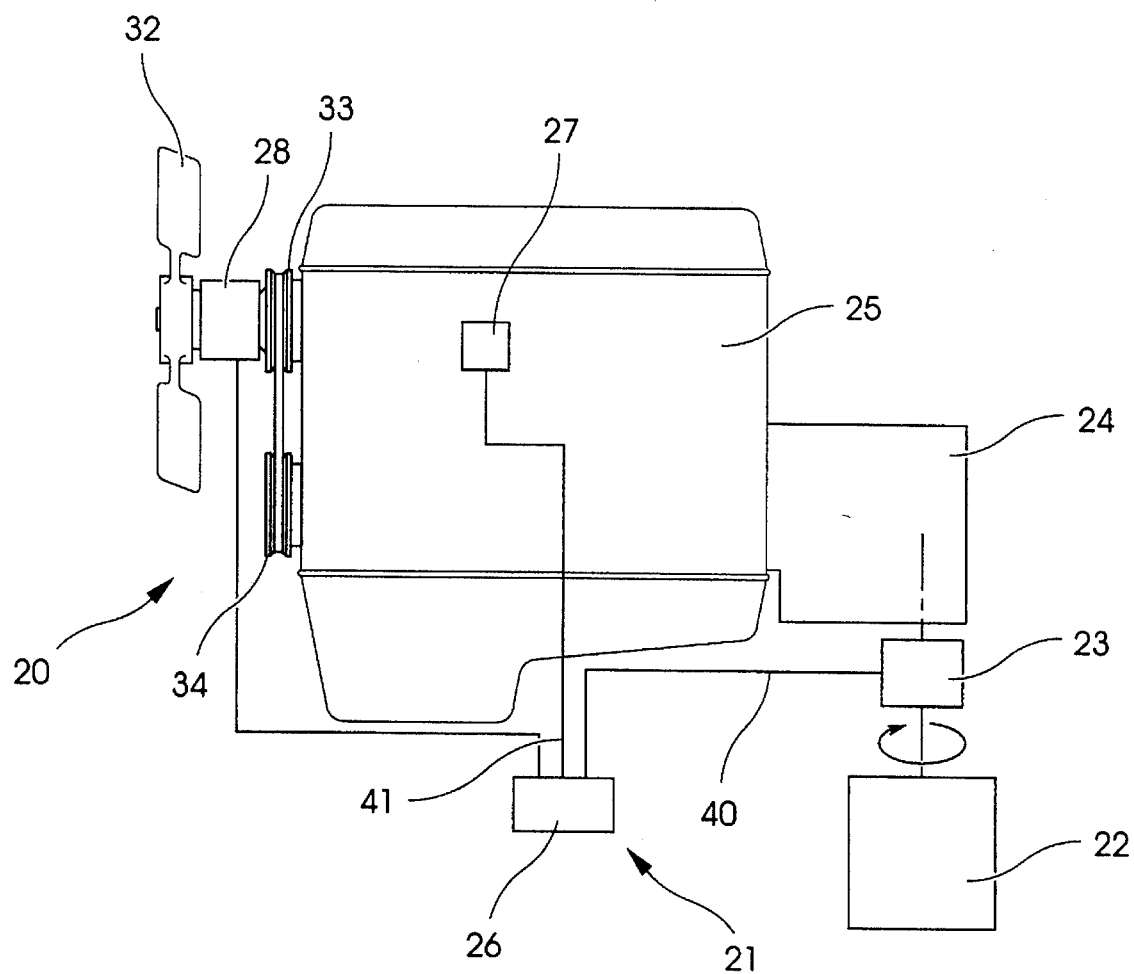
FIG. 1 is a schematic illustration of an accessory control system for a vehicle according to a typical embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1 there is illustrated in schematic form a vehicle 20 in combination with an accessory control system 21 which is structured and arranged according to the present invention. While the FIG. 1 engine can be regarded as a somewhat generic engine representation, one possibility is a farm combine which is outfitted with an unloader. For this specific example, the unloader 22 is controlled by clutch 23 which is connected to the power takeoff 24 of the engine 25 of vehicle 20.

A logic control circuit or module is disposed within logic box 26 which in turn is connected to clutch 23, engine temperature sensor 27 and fan clutch 28. The fan 32 (fan blade 32a) is driven through clutch 28 by driven pulley 33 which is connected to driving pulley 34 which in turn is connected to the power output of engine 25 in the normal or typical manner. Generically, fan 32 is representative of anyone of several possible power-absorbing accessories which are driven by horsepower provided by the engine. When such a power-absorbing accessory is turned off or disengaged there is an increase in the net horsepower available at the engine flywheel which can then be used by some other accessory, such as unloader 22. Sensor 27 is preferably a thermocouple positioned in the cooling system of the engine and the interior of the logic box (logic control module) includes a relay which will be triggered by the thermocouple signal.

Under normal operation, the combine is operating at a desired or preferred speed across the field and this speed is desired to be maintained. However, when it is desired to energize the unloader so that it may be utilized in combination with the combine, the driving power comes from the engine and without the present invention there is a corresponding decline in the combine speed due to the drain or diversion of some of the engine horsepower to the unloader 22.

With the present invention properly arranged and installed with the vehicle, as is illustrated in FIG. 1, when it is desired to use the combine unloader 22, the clutch 23 is engaged thereby coupling the engine power takeoff 24 to the unloader. When the clutch 23 is engaged an electrical signal is transmitted to logic box 26 via line 40. The logic box also receives an electrical signal input from the engine temperature sensor 27 (thermocouple) via line 41. If the engine (coolant system) temperature is below a predetermined threshold value (level), then upon receipt of the clutch-engaged signal over line 40, the logic box 26 energizes fan clutch 28. Energizing fan clutch 28 disengages drive power from the engine 25 via the pulley arrangement to fan 32. With the driving horsepower removed from the fan and fan blade, that horsepower is available to be used by the combine unloader 22. In effect, the power (horsepower) required to operate the unloader is provided or substantially provided by the horsepower which was previously used by the fan 32. Any power reduction to the engine and thus any reduction in vehicle speed is limited and hopefully minimized. Conceivably, the power requirement of one portion or accessory, such as the unloader, might not be exactly equal to the power consumption of the disengaged accessory, such as the fan, in which case some slight power drain may come from some other portion of the vehicle, such as engine 25.

The foregoing discussion is focused on the situation where the engine temperature is below some threshold level. Although not specifically stated, but clearly implied, is the fact that the threshold level is a temperature level at which the engine and vehicle can operate safely. With the engine temperature at a sufficiently low (safe) level, it is possible to engage the fan clutch 28 and thereby disengage fan 32 so that there is no power drain for rotating the fan blade 32a. This will cause the engine temperature to increase, but the time duration that the unloader is actually running may in fact be short enough that the engine temperature never rises to an unsafe or potentially damaging level.

In the event the engine temperature (cooling system) is above the predetermined threshold level, then in order to protect the engine, the fan clutch 28 is not engaged or energized and fan 32 is not disengaged. The fan blade 32a continues rotating in order to assist in cooling of the engine. While the present invention may not be used at every opportunity due to these types of constraints, such as protecting the engine 25 from overheating, the present invention will provide a novel advantage, when it can be used, in that it diverts power from one accessory which is not critical and allows that power to be used by a different accessory so that engine horsepower used to drive the vehicle at a desired speed is not reduced.

A further feature of the present invention is the continuous temperature monitoring by sensor 27. While the engine (cooling system) may have initially been below the predetermined threshold level when power was diverted from the fan blade to the unloader, what happens as the engine temperature rises? Since the temperature is constantly monitored, whenever the temperature reaches (or exceeds) the predetermined level, the fan clutch is deenergized and the fan is engaged and the fan blade begins rotating in order to provide cooling to the engine. This is important so that the engine will not be damaged by over heating. This type of operation may in fact cycle back and forth as the engine heats up and cools down.

Whenever the fan is operating the power for the unloader will be diverted from the engine and vehicle speed will decrease to some degree. Of course, it is possible to drop or disengage some other power-absorbing accessory (power drain) which might not be needed on a continuous basis. By dropping this secondary power-absorbing accessory it may be possible to actually maintained the desired vehicle speed even though the fan is in fact operating while the unloader is being used. The prioritizing and selection hierarchy of power-absorbing accessories which are to be engaged or disengaged is controlled by the logic control module (logic box 26) which is adapted to receive a plurality of line inputs from remote sensors. Although only a single remote sensor (engine temperature sensor 27) has been illustrated, and even though only two signal output lines have been illustrated, it is to be understood that the logic control module can be designed to accept a number of line inputs from remote sensors and provide a number of output lines to various power-absorbing accessories in order to control the operation of these additional accessories.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An accessory control system for a vehicle having an engine, a cooling fan driven by said engine and a selectively-operable, power-requiring accessory, said accessory control system comprising:

a logic control module;

a first signal output line electrically connected between said logic control module and said power-requiring accessories;

an engine temperature sensor connected to said engine and operable to send a temperature signal to said logic control module based upon the engine temperature;

a signal input line electrically connected between said logic control module and said engine temperature sensor; and a second signal output line electrically connected between said logic control module and said cooling fan, such that when said power-requiring accessory is energized and said engine temperature is below a predetermined threshold level, the logic control module disengages the cooling fan in order to make more power available for operation of the power-requiring accessory.

2. The accessory control system of claim 1 wherein said engine temperature sensor is constructed and arranged to sense the engine coolant temperature.

3. The accessory control system of claim 2 wherein said engine temperature sensor is constructed and arranged to provide continuous monitoring of engine coolant temperature.

4. The accessory control system of claim 3 wherein said engine temperature sensor includes a thermocouple and said logic control module includes a relay which is operable to be triggered by a signal from said thermocouple.

5. The accessory control system of claim 4 which further includes a clutch positioned between said engine and said power-requiring accessory, said engine having a power takeoff and said clutch being mechanically coupled to said power takeoff.

6. The accessory control system of claim 5 wherein said predetermined threshold level represents a coolant temperature at which the engine can be operated without thermal damage.

7. The accessory control system of claim 1 wherein said engine temperature sensor includes a thermocouple and said logic control module includes a relay which is operable to be triggered by a signal from said thermocouple.

8. The accessory control system of claim 1 which further includes a clutch positioned between said engine and said power-requiring accessory, said engine having a power takeoff and said clutch being mechanically coupled to said power takeoff.

9. The accessory control system of claim 1 wherein said predetermined threshold level represents a coolant temperature at which the engine can be operated without thermal damage.

10. An accessory control system for a vehicle having an engine, a cooling fan driven by said engine and a power-requiring accessory, said accessory control system comprising:

a logic control module;

a first signal output line electrically connected between said logic control module and said power-requiring accessories;

an engine temperature sensor connected to said engine and operable to send a temperature signal to said logic control module based upon the engine temperature;

a signal input line electrically connected between said logic control module and said engine temperature sensor; and a second signal output line electrically connected between said logic control module and said cooling fan, such that when said power-requiring accessory is energized and said engine temperature is below a predetermined threshold level, the logic control module disengages the cooling fan.

11. The accessory control system of claim 10 wherein said engine temperature sensor is constructed and arranged to sense the engine coolant temperature.

12. The accessory control system of claim 11 wherein said engine temperature sensor is constructed and arranged to provide continuous monitoring of engine coolant temperature.

13. The accessory control system of claim 12 wherein said engine temperature sensor includes a thermocouple and said logic control module includes a relay which is operable to be triggered by a signal from said thermocouple.

14. The accessory control system of claim 13 which further includes a clutch positioned between said engine and said power-requiring accessory, said engine having a power takeoff and said clutch being mechanically coupled to said power takeoff.

15. The accessory control system of claim 14 wherein said predetermined threshold level represents a coolant temperature at which the engine can be operated without thermal damage.

16. The accessory control system of claim 10 wherein said engine temperature sensor includes a thermocouple and said logic control module includes a relay which is operable to be triggered by a signal from said thermocouple.

17. The accessory control system of claim 10 which further includes a clutch positioned between said engine and said power-requiring accessory, said engine having a power takeoff and said clutch being mechanically coupled to said power takeoff.

18. The accessory control system of claim 10 wherein said predetermined threshold level represents a coolant temperature at which the engine can be operated without thermal damage.

\* \* \* \* \*